US011996647B2

(12) United States Patent
Behrendt et al.

(10) Patent No.: US 11,996,647 B2
(45) Date of Patent: May 28, 2024

(54) ELECTRICAL CONNECTORS WITH TAPERED TERMINAL PASSAGEWAYS

(71) Applicant: Lear Corporation, Southfield, MI (US)

(72) Inventors: Andreas Behrendt, Remscheid (DE); Marcin Szatko, Remscheid (DE); Yasin Canol, Remscheid (DE); Marlon Christian Grosser, Remscheid (DE)

(73) Assignee: Lear Corporation, Southfield, MI (US)

( * ) Notice: Subject to any disclaimer, the term of this patent is extended or adjusted under 35 U.S.C. 154(b) by 219 days.

(21) Appl. No.: 17/550,206

(22) Filed: Dec. 14, 2021

(65) Prior Publication Data

US 2022/0190505 A1 Jun. 16, 2022

(30) Foreign Application Priority Data

Dec. 14, 2020 (DE) ......................... 102020133319.6

(51) Int. Cl.
*H01R 13/50* (2006.01)
*H01R 13/52* (2006.01)

(52) U.S. Cl.
CPC ............ *H01R 13/50* (2013.01); *H01R 13/52* (2013.01)

(58) Field of Classification Search
CPC .... H01R 13/50; H01R 13/52; H01R 13/5208; H01R 13/40; H01R 13/502
See application file for complete search history.

(56) References Cited

U.S. PATENT DOCUMENTS 5,931,699 A * 8/1999 Saito .................. H01R 13/5208 439/275
7,371,115 B1 * 5/2008 Hsieh ................. H01R 13/5208 439/271
11,539,159 B2 * 12/2022 Urbaniak ........... H01R 13/5208
2001/0029120 A1 10/2001 Miyazaki et al.
2011/0187213 A1 8/2011 Kitagawa et al.
2012/0295483 A1 11/2012 Smed
2013/0216883 A1 8/2013 Kawatani et al.
2015/0136471 A1 5/2015 Muehlmichel et al.

(Continued)

FOREIGN PATENT DOCUMENTS

| | | | |
|---|---|---|---|
| DE | 102011006838 | A1 | 10/2012 |
| DE | 102013110545 | A1 | 3/2015 |
| JP | 2013062030 | A | 4/2013 |

OTHER PUBLICATIONS

German Patent and Trademark Office, Examination Report, Application No. 102020133319.6, dated Sep. 8, 2021.

*Primary Examiner* — Travis S Chambers
(74) *Attorney, Agent, or Firm* — MacMillan, Sobanski & Todd, LLC

(57) ABSTRACT

An electrical connector includes a housing that has a housing first end, a housing second end, and a housing main body that defines a recess, a recess base, a projection, a projection end, and a plurality of terminal passageways. The recess extends from the housing first end toward the housing second end and to the recess base. The projection extends from the recess base toward the housing first end and to the projection end. Each terminal passageway of the plurality of terminal passageways has an inner wall. The inner wall has an inner wall first end, an inner wall second end, and an inner wall length that extends from the inner wall first end to the inner wall second end. The inner wall tapers along a portion of the inner wall length.

19 Claims, 11 Drawing Sheets

(56) References Cited

U.S. PATENT DOCUMENTS

| | | | | |
|---|---|---|---|---|
| 2015/0140847 | A1* | 5/2015 | Kanemura ....... | H01R 13/62938 439/259 |
| 2020/0059036 | A1 | 2/2020 | Kim et al. | |

* cited by examiner

ELECTRICAL CONNECTORS WITH TAPERED TERMINAL PASSAGEWAYS

BACKGROUND OF THE INVENTION

The disclosure relates generally to the field of electrical connectors. More particularly, the disclosure relates to electrical connectors that include tapered terminal passageways.

Conventional electrical connectors often include a sealing member disposed between two housings to prevent water from penetrating the housings. The sealing member includes a plurality of wire insertion passageways through which a plurality of electrical wires with attached contacts can be passed. The contacts are then positioned within terminal passageways defined by the housings. Each of the terminal passageways defined by the housing of a conventional electrical connector has a chamfer at an entry end, a constant inside diameter along its length, and is sized to only receive a portion of an electrical wire and an attached contact. As a result of this structural configuration, the sealing member often becomes damaged around the insertion passageways when electrical wires and attached contacts are inserted into, and removed from, the terminal passageways.

For example, as shown in FIGS. 1 through 4, a conventional electrical connector 10 has a housing 12 that defines a plurality of terminal passageways 14 that extend through a portion of the housing 12. As shown best in FIGS. 2, 3, and 4, each passageway of the plurality of terminal passageways 14 has a chamfer 16 at its entry end 18, a constant inside diameter 15 along its length 17, and is sized only receive a portion of an electrical wire and an attached contact, which prevents any portion of a sealing member from entering a terminal passageway during use.

A need exists, therefore, for new and useful electrical connectors that include improved terminal passageways.

SUMMARY OF THE INVENTION

Various example electrical connectors that include tapered terminal passageways are described herein.

An example electrical connector includes a housing that has a housing first end, a housing second end, and a housing main body. The housing main body defines a recess, a recess base, a projection, a projection end, and a plurality of terminal passageways. The recess extends from the housing first end toward the housing second end and to the recess base. The projection extends from the recess base toward the housing first end and to the projection end. Each terminal passageway of the plurality of terminal passageways has an inner wall. The inner wall has an inner wall first end disposed at the projection end, an inner wall second end disposed between the projection end and the housing second end, and an inner wall length that extends from the inner wall first end to the inner wall second end. The inner wall tapers along a portion of the inner wall length that extends from the inner wall first end toward the inner wall second end.

Another example electrical connector includes a housing that has a housing first end, a housing second end, and a housing main body. The housing main body defines a recess, a recess base, a projection, a projection end, and a plurality of terminal passageways. The recess extends from the housing first end toward the housing second end and to the recess base. The recess base is disposed a first distance from the housing first end. The projection extends from the recess base toward the housing first end and to the projection end. Each terminal passageway of the plurality of terminal passageways has an inner wall. The inner wall has an inner wall first end disposed at the projection end, an inner wall second end disposed between the projection end and the housing second end, an inner wall length that extends from the inner wall first end to the inner wall second end, an inner wall first portion, an inner wall second portion, and an inner wall third portion. The inner wall first portion has a first inside diameter, the inner wall second portion has a second inside diameter, and the inner wall third portion has a third inside diameter. The inner wall first portion extends from the inner wall first end toward the inner wall second end and to the inner wall second portion. The inner wall second portion extends from the inner wall first portion toward the inner wall second end and to the inner wall third portion. The inner wall third portion extends from the inner wall second portion to the inner wall second end. The first inside diameter is greater than the second inside diameter. The second inside diameter is greater than the third inside diameter. The inner wall tapers along a portion of the inner wall length that extends from the inner wall first end toward the inner wall second end. The inner wall first portion and the inner wall second portion meet at a first location along the inner wall length. The inner wall second portion and the inner wall third portion meet at a second location along the inner wall length. The first location is disposed a second distance from the housing first end. The second location is disposed a third distance from the housing first end. The first distance is greater than the second distance. The third distance is greater than the second distance. The third distance is closer to the first distance than the second distance.

Another example electrical connector includes a housing that has a housing first end, a housing second end, and a housing main body. The housing main body defines a recess, a recess base, a projection, a projection end, and a plurality of terminal passageways. The recess extends from the housing first end toward the housing second end and to the recess base. The recess base is disposed a first distance from the housing first end. The projection extends from the recess base toward the housing first end and to the projection end. Each terminal passageway of the plurality of terminal passageways has an inner wall. The inner wall has an inner wall first end disposed at the projection end, an inner wall second end disposed between the projection end and the housing second end, an inner wall length that extends from the inner wall first end to the inner wall second end, an inner wall first portion, an inner wall second portion, and an inner wall third portion. The inner wall first portion has a first inside diameter, the inner wall second portion has a second inside diameter, and the inner wall third portion has a third inside diameter. The inner wall first portion extends from the inner wall first end toward the inner wall second end and to the inner wall second portion. The inner wall second portion extends from the inner wall first portion toward the inner wall second end and to the inner wall third portion. The inner wall third portion extends from the inner wall second portion to the inner wall second end. The first inside diameter is greater than the second inside diameter. The second inside diameter is greater than the third inside diameter. The inner wall tapers along the inner wall first portion and the inner wall second portion. The inner wall first portion and the inner wall second portion meet at a first location along the inner wall length. The inner wall second portion and the inner wall third portion meet at a second location along the inner wall length. The first location is disposed a second distance from the housing first end. The second location is disposed a third distance from the housing first end and a fourth distance from the projection end that is greater than 1 millimeter. The first distance is greater than the second distance. The third distance is greater than the second distance. The third distance is closer to the first distance than the second distance.

Additional understanding of these examples can be obtained by review of the detailed description, below, and the appended drawings.

DETAILED DESCRIPTION OF THE PREFERRED EMBODIMENT

Figure 1:
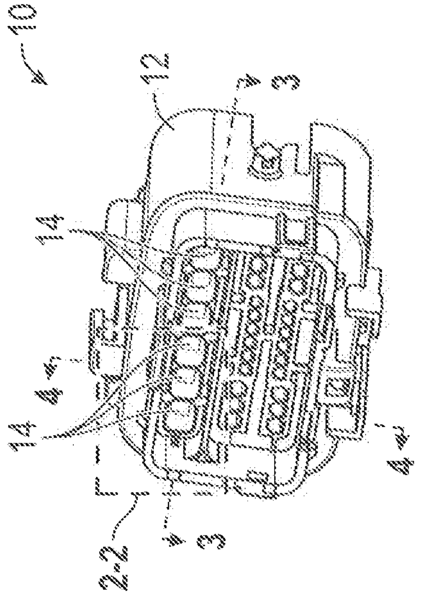
FIG. 1 (Prior Art)
FIG. 1 is a perspective view of prior art electrical connector.
Figure 2:
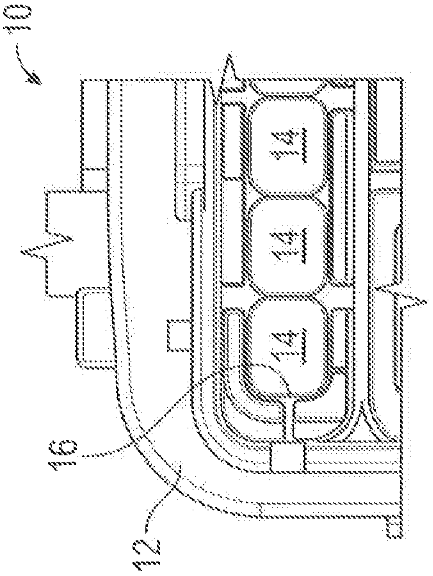
FIG. 2 (Prior Art)
FIG. 2 is a magnified elevation view of area 2-2 shown in FIG. 1.
Figure 3:
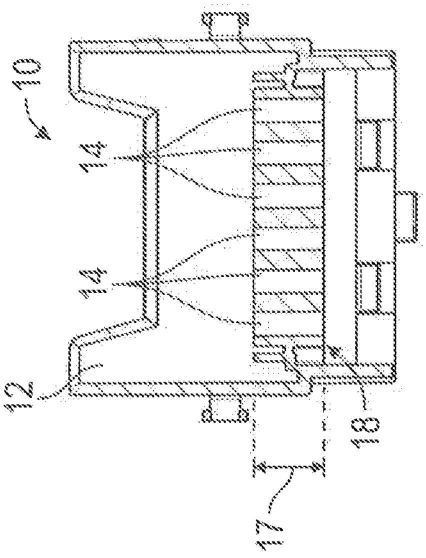
FIG. 3 (Prior Art)
FIG. 3 is a cross-sectional view of the electrical connector illustrated in FIG. 1 taken along line 3-3.
Figure 4:
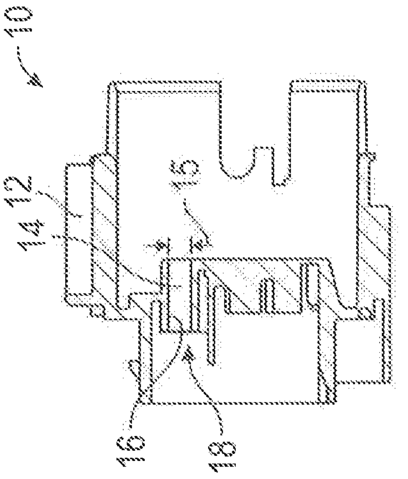
FIG. 4 (Prior Art)
FIG. 4 is a cross-sectional view of the electrical connector illustrated in FIG. 1 taken along line 4-4.
Figure 5:
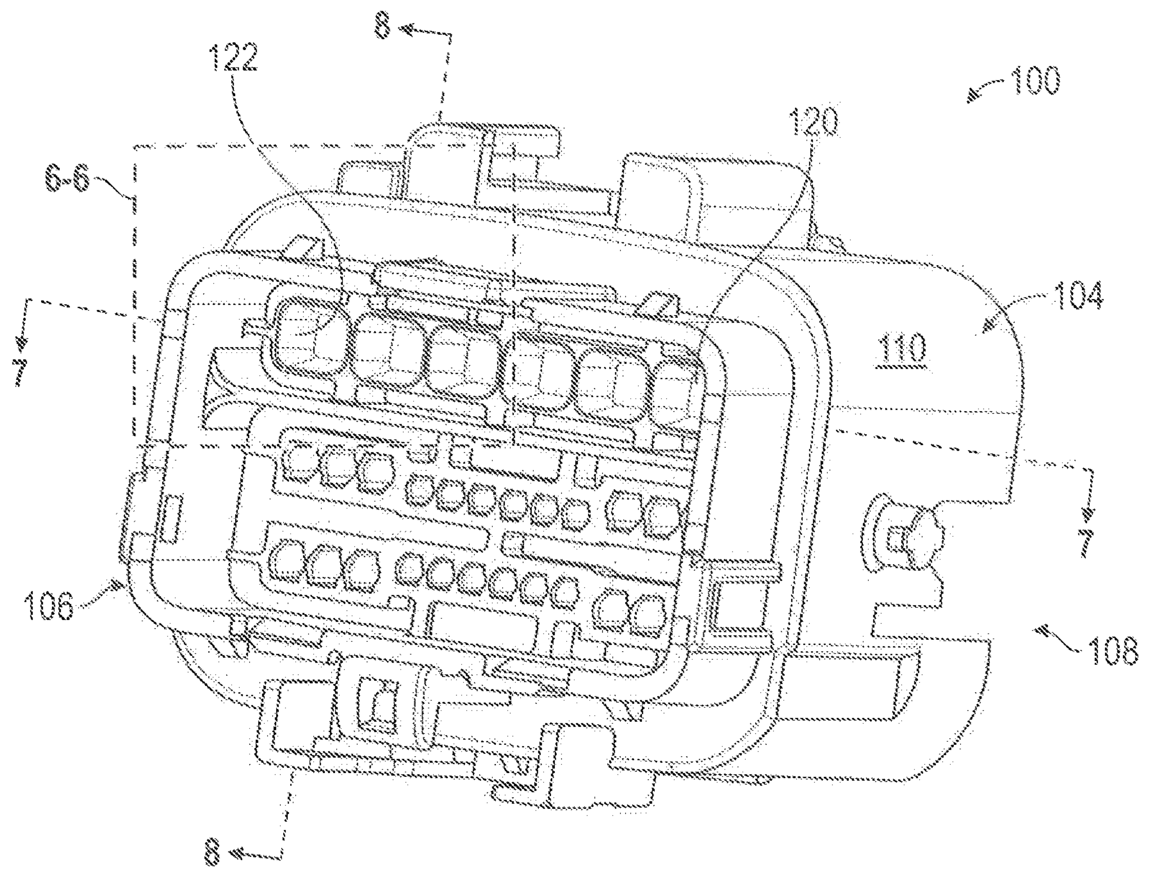
FIG. 5 is a perspective view of a first embodiment of an electrical connector that includes tapered terminal passageways.
Figure 6:
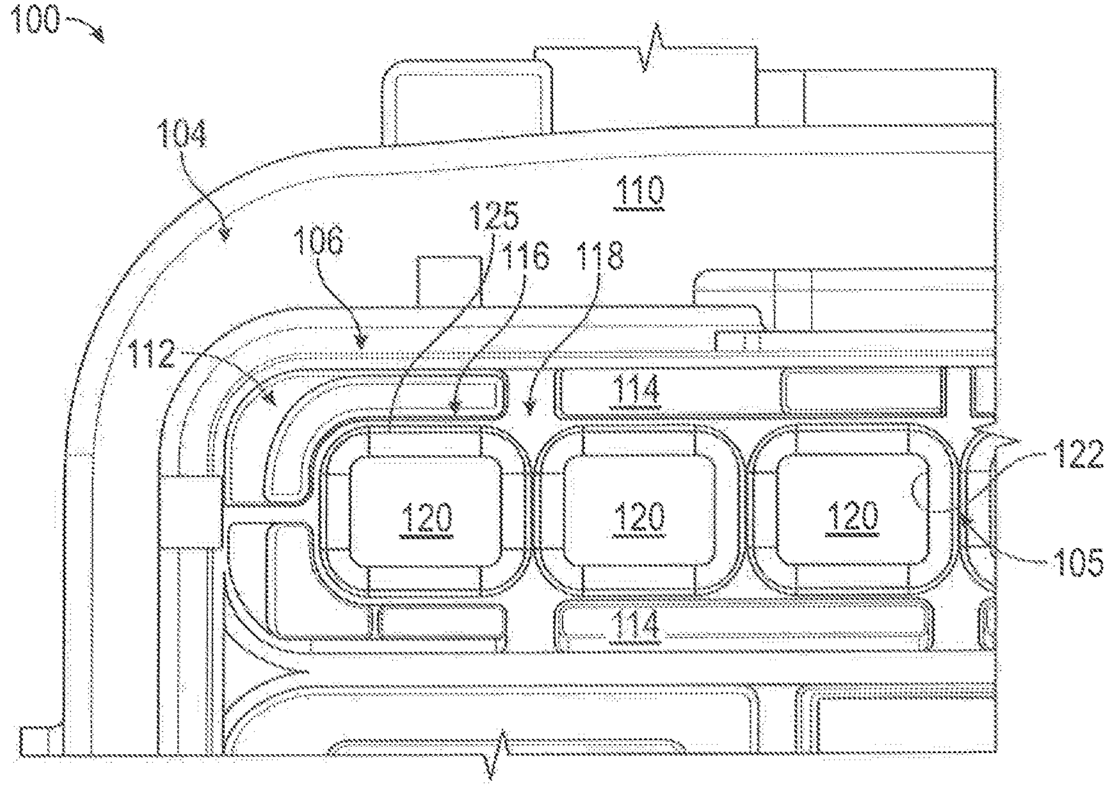
FIG. 6 is a magnified elevation view of area 6-6 shown in FIG. 5.

The following detailed description and the appended drawings describe and illustrate various example embodiments of electrical connectors that include tapered terminal passageways. The description and illustration of these examples are provided to enable one skilled in the art to make and use an electrical connector that includes tapered terminal passageway. They are not intended to limit the scope of the claims in any manner.

As used herein, the term "diameter" refers to the length of a straight line passing from side to side through the center of a body, element, or feature, and does not impart any structural configuration on the body, element, or feature.

FIGS. 5, 6, 7, 8, 9, 10, and 11 illustrate a first embodiment of an electrical connector 100 that includes a plurality of terminal passageways 120, as described in more detail herein. In the illustrated embodiment, the electrical connector 100 has a housing 104 that has a housing lengthwise axis 105, a housing first end 106, a housing second end 108, and a housing main body 110.

Figure 7:
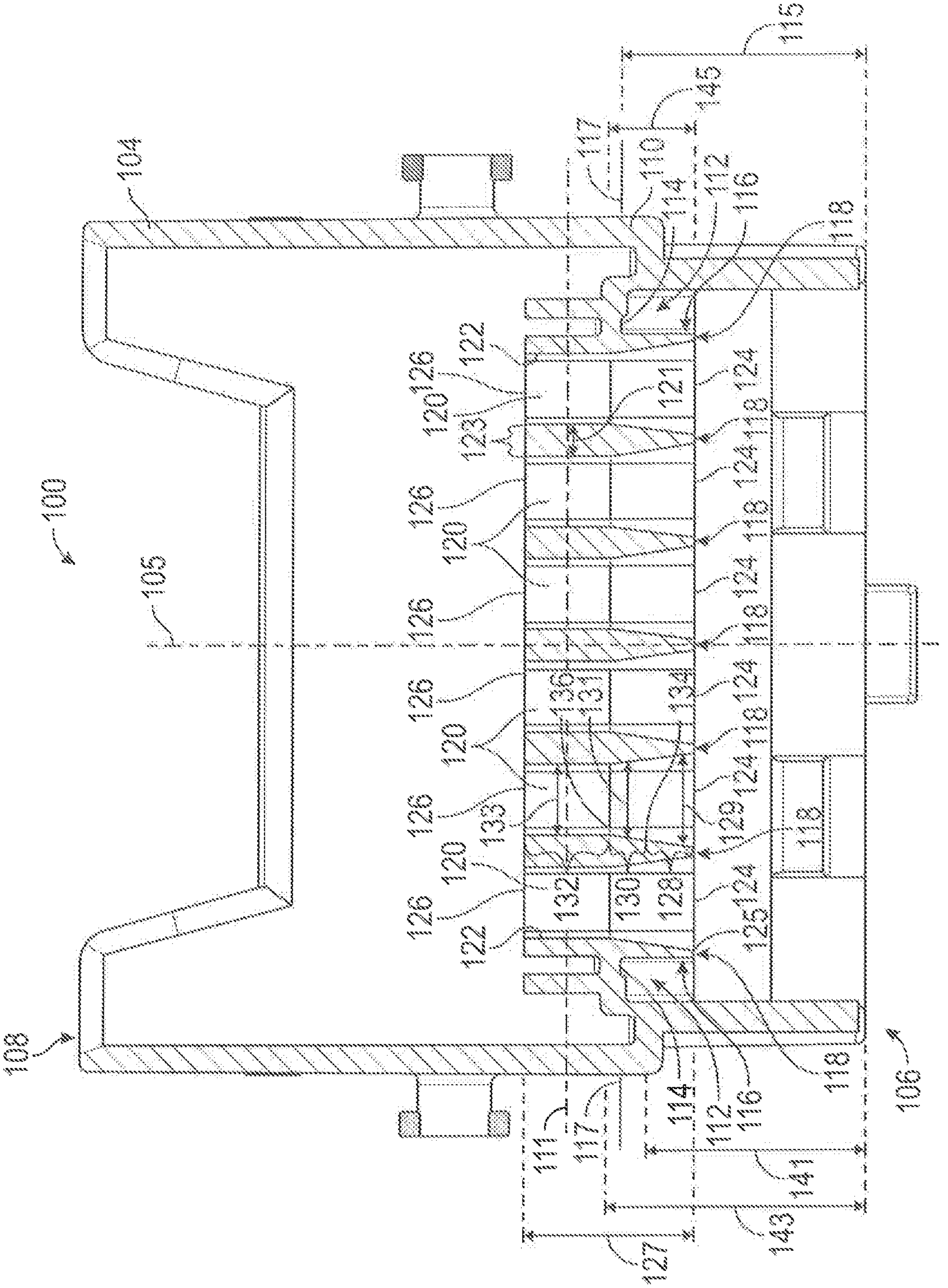
FIG. 7 is a cross-sectional view of the electrical connector illustrated in FIG. 5 taken along line 7-7.
Figure 8:
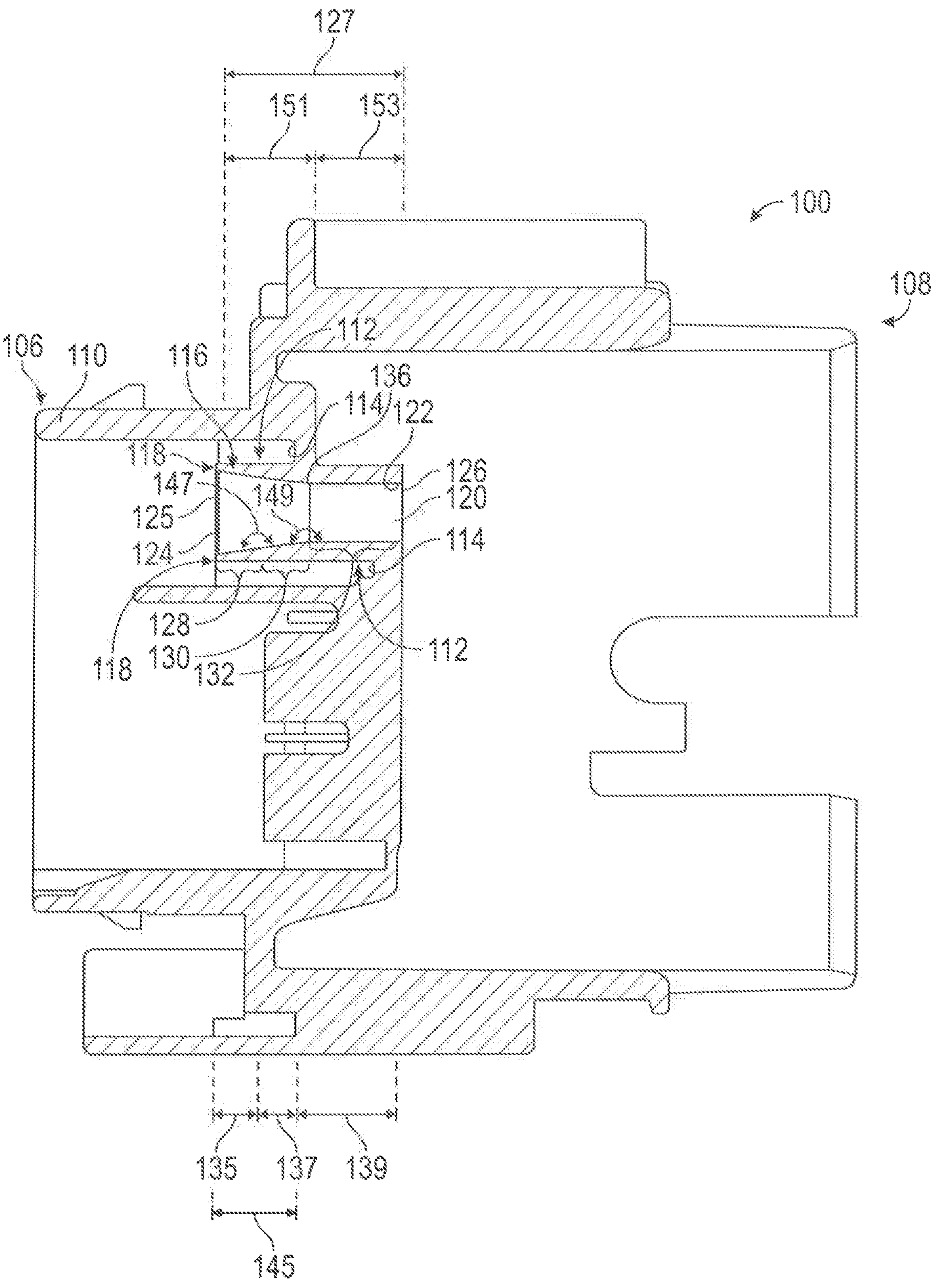
FIG. 8 is a cross-sectional view of the electrical connector illustrated in FIG. 5 taken along line 8-8.

The housing main body 110 defines a recess 112, a recess base 114, a projection 116, a projection end 118, and plurality of terminal passageways 120. The recess 112 extends from the housing first end 106 toward the housing second end 108 to the recess base 114. The recess base 114 is disposed between the projection end 118 and the housing second end 108. As shown in FIGS. 7 and 8, the recess base 114 is disposed a first distance 115 from the housing first end 106 and on a hypothetical plane 117 that intersects the housing lengthwise axis 105 orthogonally. The projection 116 extends from the recess base 114 toward the housing first end 106 and to the projection end 118. The projection end 118 is disposed between housing first end 106 and the recess base 114 (e.g., the hypothetical plane 117).

In the illustrated embodiment, the housing main body 110 defines six terminal passageways 120 that are disposed on an axis 111 that intersects the housing lengthwise axis 105 orthogonally. Each terminal passageway of the plurality of terminal passageways 120 extends from the projection end 118 toward the housing second end 108. Each terminal passageway of the plurality of terminal passageways 120 has an inner wall 122 defined by the housing main body 110 that has a rectangular cross-sectional configuration taken along a hypothetical plane disposed orthogonally to the housing lengthwise axis 105. As shown in FIGS. 7 and 8, the inner wall 122 has an inner wall first end 124, an inner wall second end 126, and an inner wall length 127 that extends from the inner wall first end 124 to the inner wall second end 126. The inner wall first end 124 is disposed at the projection end 118 and includes a chamfer 125. However, alternative embodiments can omit the inclusion of a chamfer on an inner wall first end. The inner wall second end 126 is disposed between the projection end 118 and the housing second end 108. In the embodiment illustrated, the inner wall second end 126 is disposed between the hypothetical plane 117 on which the recess base 114 is disposed and the housing second end 108. The inner wall 122 tapers along a portion of the inner wall length 127 that extends from the inner wall first end 124 toward the inner wall second end 126.

As shown in FIGS. 7 through 11, the inner wall 122 has an inner wall first portion 128, an inner wall second portion 130, and an inner wall third portion 132. The inner wall first portion 128 has a first inside diameter 129, the inner wall second portion 130 has a second inside diameter 131, and the inner wall third portion 132 has a third inside diameter 133. The first inside diameter 129 is disposed at the inner wall first end 124 and is greater than the second inside diameter 131. The second inside diameter 131 is disposed between the inner wall first portion 128 and the inner wall third portion 132 and is greater than the third inside diameter 133.

Figure 11:
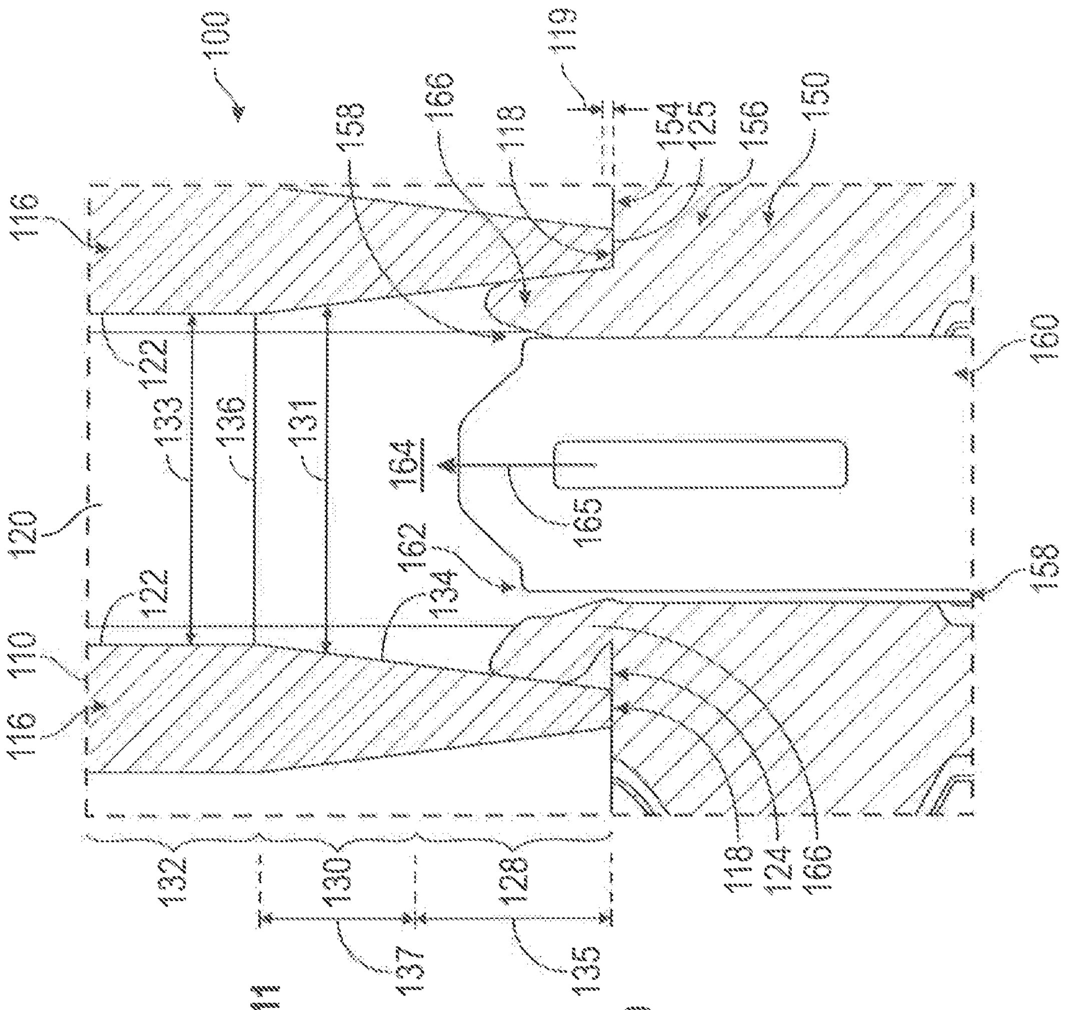
FIG. 11 is a magnified view of area 11-11 shown in FIG. 10. The electrical contact is being advanced through the sealing member and into a terminal passageway.
Figure 10:
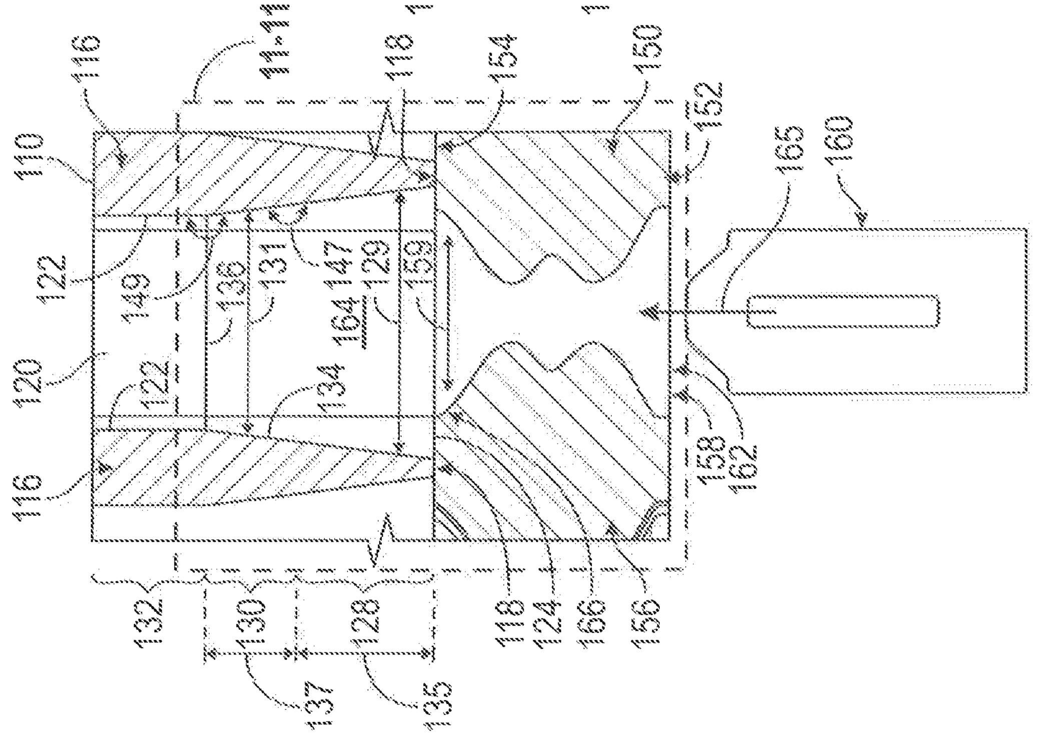
FIG. 10 is a magnified view of area 10-10 shown in FIG. 9. An electrical contact is illustrated adjacent to the sealing member.

The inner wall first portion 128 extends from the inner wall first end 124 toward the inner wall second end 126 and to the inner wall second portion 130. As shown in FIGS. 8, 10, and 11, the inner wall first portion 128 has a first portion length 135 that extends from the inner wall first end 124 to the inner wall second portion 130. The inner wall second portion 130 extends from the inner wall first portion 128 toward the inner wall second end 126 and to the inner wall third portion 132. As shown in FIGS. 8, 10, and 11, the inner wall second portion 130 has a second portion length 137 that extends from the inner wall first portion 128 to the inner wall third portion 132. The inner wall third portion 132 extends from the inner wall second portion 130 to the inner wall second end 126. As shown in FIG. 8, the inner wall third portion 132 has a third portion length 139 that extends from the inner wall second portion 130 to the inner wall second end 126. The inner wall first portion 128 and the inner wall second portion 130 meet at a first location 134 along the inner wall length 127 that is disposed a second distance 141 from the housing first end 106. The inner wall second portion 130 and the inner wall third portion 132 meet at a second location 136 disposed a third distance 143 from the housing first end 106. As shown in FIGS. 7 and 8, the inner wall second end 126 is disposed between the second location 136 and the housing second end 108. The first distance 115 from the inner wall first end 106 to the recess base 114 is greater than the second distance 141 and the third distance 143 is greater than the second distance 141. The third distance 143 is closer to the first distance 115 than the second distance 141. Thus, the second location 136 is disposed closer to the hypothetical plane 115 than the inner wall first end 124. However, alternative embodiments can include an inner wall that has a second location that is disposed a third distance from a housing first end that is less than, or equal to, a first distance. The second location 136 is disposed a fourth distance 145 from the projection end 118 that is greater than 1 millimeter. In the illustrated embodiment, the second location 136 is disposed a fourth distance 145 from the projection end 118 that is equal to about 5 millimeters. As shown in FIG. 8, the inner wall 122 has an inner wall first length 151 that extends from the inner wall first end 124 to the second location 136 and the inner wall 122 has an inner wall second length 153 that extends from the second location 136 to the inner wall second end 126. The inner wall second length 153 is greater than the inner wall first length 151. However, alternative embodiments can include an inner wall that has an inner wall second length that is equal to, or less than an inner wall first length.

Figure 9:
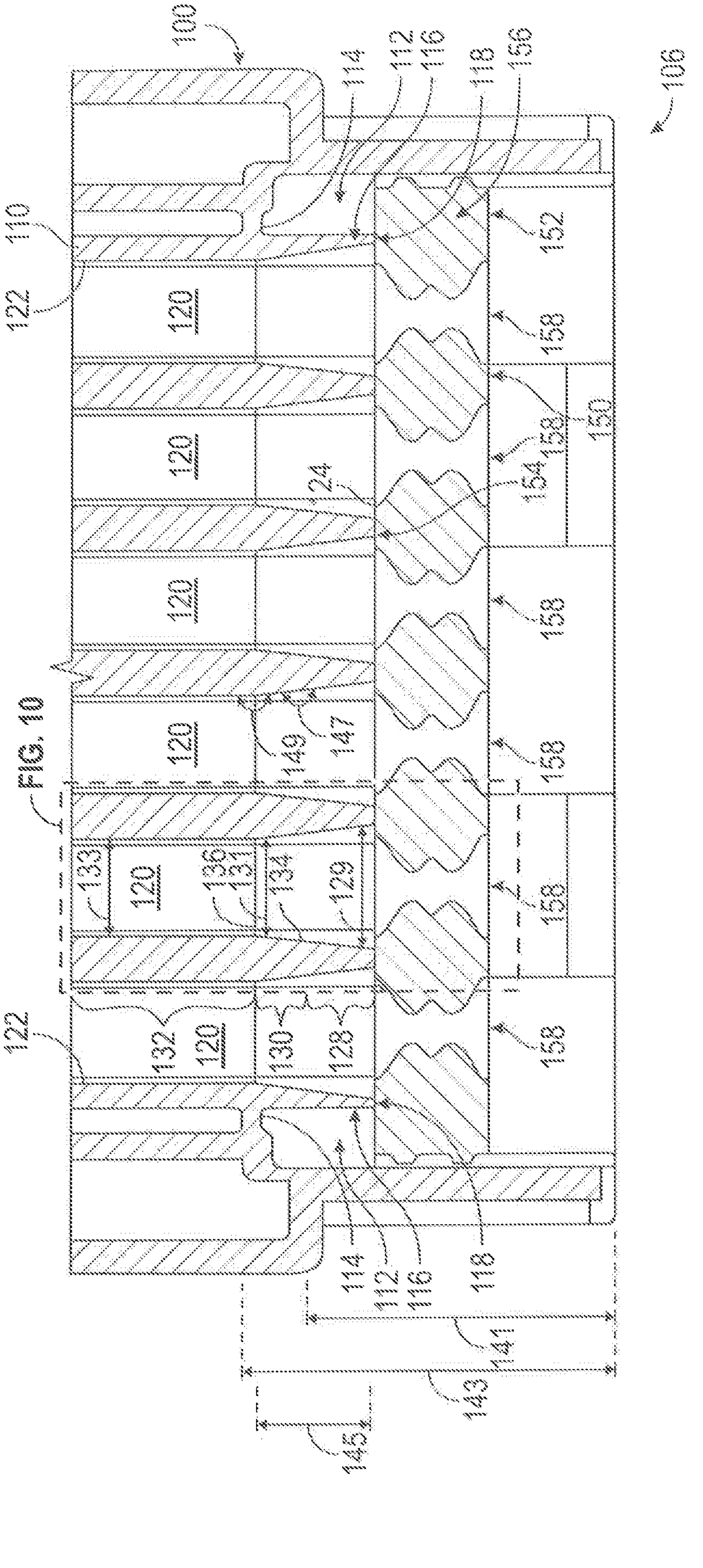
FIG. 9 is a partial cross-sectional view of the electrical connector illustrated in FIG. 5 taken along line 7-7. A sealing member is disposed adjacent to and contacting the housing.

As shown in FIGS. 5 through 11, the inner wall 122 tapers along the inner wall first portion 128, tapers along the inner wall second portion 130, and the inner wall third portion 132 has a constant inside diameter. In the illustrated embodiment, the inner wall 122 tapers along its entire perimeter (e.g., height and width) and linearly along the entire first portion length 135, the inner wall 122 tapers along its entire perimeter (e.g., height and width) and linearly along the entire second portion length 137, and the inner wall 122 has a third portion 132 that has a constant inside diameter (e.g., height and width) along the entire third portion length 139. However, alternative embodiments can include an inner wall that tapers along a portion of its perimeter along a portion, or the entirety, of a first portion length and/or a second portion length, an inner wall that tapers linearly, or non-linearly (e.g., is curved) along a portion, or the entirety, of a first portion length and/or a second portion length, and/or an inner wall that includes a third portion that has an inside diameter (e.g., height and width) that varies along a third portion length. As used herein, the term "perimeter" shall mean the boundary of an object, feature, or element as taken along a hypothetical plane disposed orthogonally to a housing lengthwise axis (e.g., housing lengthwise axis 105). As shown in FIGS. 8, 9, and 10, the inner wall first portion 128 is disposed at a first angle 147 relative to the inner wall second portion 130 that is equal to 180 degrees and the inner wall second portion 130 is disposed at a second angle 149 relative to the inner wall third portion 132 that is greater than 180 degrees. In the embodiment shown, the second angle 149 is equal to 188 degrees.

As shown in FIGS. 9, 10, and 11, the electrical connector 100 can include a sealing member 150 that is disposed adjacent to, and contacts, the housing 104. The sealing member 150 has a sealing member first end 152, a sealing member second end, 154, and a sealing member main body 156. The sealing member second end 154 is disposed adjacent to and contacts the housing 104. The sealing member main body 156 defines a plurality of sealing member passageways 158 aligned with the plurality of terminal passageways 120. Each sealing member passageway of the plurality of sealing member passageways 158 has a fourth inside diameter 159 at the sealing member second end 154 that is less than the first inside diameter 129 of the inner wall first portion 128. The sealing member 150 is configured to move between a first configuration, as shown in FIG. 10, and a second configuration, as shown in FIG. 11. In the illustrated embodiment, the housing main body 110 is formed of a first material and the sealing member 150 is formed of a second material that is relatively more flexible than the first material.

Movement of the sealing member 150 from its first configuration to its second configuration is accomplished by inserting an electrical contact 160, or other object, through a passageway 162 of the plurality of sealing member passageways 158 and into a first passageway 164 of the plurality of terminal passageways 120 in the direction of arrow 165, as shown in FIGS. 10 and 11. Conversely, movement of the sealing member 150 from its second configuration to its first configuration is accomplished by removing the electrical contact 160 from the first passageway 164 of the plurality of terminal passageways 120 and the passageway 162 of the plurality of sealing member passageways 158.

In the first configuration, a portion 166 of the sealing member main body 156 is disposed outside of the first passageway 164 of the plurality of terminal passageways 120. In the second configuration, the portion 166 of the sealing member main body 156 is disposed within the first passageway 164 of the plurality of terminal passageways 120 such that it is disposed adjacent to the inner wall 122. In the illustrated embodiment, in the second configuration, the portion 166 of the sealing member main body 156 is disposed within the first passageway 164 of the plurality of terminal passageways 120 and is disposed adjacent to the inner wall first portion 128. Depending on the structural arrangement of a sealing member, in some embodiments a sealing member can be disposed adjacent to and/or contact an inner wall first portion, an inner wall second portion, and/or an inner wall third portion when in the second configuration.

As shown in FIGS. 1 through 4, the prior art includes an electrical connector 10 that includes a plurality of terminal passageways 14 and each terminal passageway 14 includes a chamfer 16 at its entry end 18, has a constant inside diameter 15 along its length 17 that extends from the chamfer 15, and is sized only to receive a portion of an electrical wire and an attached contact. In the illustrated embodiment, the electrical connector 100 has a chamfer 125 at the inner wall first end 124 and the inner wall 122 tapers from the chamfer 125 along the inner wall first portion 128, tapers along the inner wall second portion 130, and the inner wall third portion 132 has a constant inside diameter. Each passageway of the plurality of terminal passageways 120 is sized to receive a portion of an electrical contact 160 and a portion of the sealing member main body 156. This is accomplished by including an increased inside diameter along the inner wall first portion 128 relative to prior electrical connectors 10 and including one or more tapered portions along the inner wall length 127, which are not included in prior art electrical connectors 10. As used herein, a chamfer refers to a transitional surface between a projection end and an inner wall that has a length measured along an axis disposed parallel to a housing lengthwise axis that is less than 20% of a width of a portion of a projection disposed between two terminal passageways measured along an axis that extends through an inner wall third portion and intersects a housing lengthwise axis orthogonally. As shown in FIGS. 7 and 11, the chamfer 125 is a transitional surface between a projection end 118 and an inner wall 122 that has a length 119 measured along an axis disposed parallel to a housing lengthwise axis 105 and that is less than 20% of the width 121 of a portion 123 of the projection 116 disposed between two terminal passageways of the plurality of terminal passageways 120. The width 121 is measured along the axis 111 that extends through the inner wall third portion 130 and intersects a housing lengthwise axis 105 orthogonally. The portions of the inner wall that tapered are distinguishable from the chamfers described herein at least because each portion of the inner wall that tapers has a length measured along an axis disposed parallel to a housing lengthwise axis that is greater than 20% of a width of a portion of a projection disposed between two terminal passageways measured along an axis that extends through an inner wall third portion and intersects a housing lengthwise axis orthogonally. In the illustrated embodiment, the inner wall 122 tapers along the entire first portion length 135 and along the entire second portion length 137. Each of the first portion length 135 and the second portion length 137 is measured along an axis disposed parallel to the housing lengthwise axis 105 that is greater than 50% of the width 121 of the portion 123 of the projection 116 disposed between two terminal passageways of the plurality of terminal passageways 120. The width 121 is measured along the axis 111 that extends through the inner wall third portion 130 and intersects the housing lengthwise axis 105 orthogonally. While specific lengths have been described with respect to portions of an inner wall that taper, a portion of an inner wall that tapers can have any suitable length and selection of a suitable length can be based on various considerations, including the intended use of an electrical connector of which a tapered portion is included. Examples of lengths considered suitable for a portion of an inner wall that tapers include lengths measured along an axis disposed parallel to a housing lengthwise axis that are greater than 20%, greater than 50%, greater than 75%, and greater than 100% of a width of a portion of a projection disposed between two terminal passageways measured along an axis that extends through an inner wall third portion and intersects a housing lengthwise axis orthogonally.

While the housing 100 has been illustrated as having a particular structural arrangement, a housing can have any suitable structural arrangement that includes one or more tapered terminal passageways. Selection of a suitable structural arrangement for a housing can be based on various considerations, including the intended use of the housing. For example, a housing can include any suitable number of terminal passageways and any suitable number of tapered terminal passageways. Examples of numbers of terminal passageways considered suitable for a housing main body to define include one, more than one, two, a plurality, three, four, five, six, seven, eight, nine, ten, more than ten, and any other number considered suitable for a particular embodiment. Examples of numbers of tapered terminal passageways considered suitable for a housing main body to define include one, more than one, two, a plurality, three, four, five, six, seven, eight, nine, ten, more than ten, each terminal passageway defined by a housing main body, a portion of the terminal passageways defined by a housing main body, and any other number considered suitable for a particular embodiment. Furthermore, a recess base defined by a housing main body can be disposed on a hypothetical plane that is disposed at any suitable angle relative to a housing lengthwise axis, such as an acute angle, a right angle, an obtuse angle, a straight angle, and/or a reflex angle. Moreover, each terminal passageway of a plurality of terminal passageways can be disposed on an axis disposed at any suitable angle relative to a housing lengthwise axis, such as an acute angle, a right angle, an obtuse angle, a straight angle, and/or a reflex angle.

An inner wall defining a terminal passageway can have any suitable structural arrangement and selection of a suitable structural arrangement for an inner wall that defines a terminal passageway can be based on various considerations, including the configuration of a sealing member intended to be used with a housing. For example, an inner wall first portion, an inner wall second portion, and an inner wall third portion can have any suitable cross-sectional configuration, inside diameter, and be disposed at any suitable angle relative to another portion of the inner wall. Examples of cross-sectional configurations considered suitable for an inner wall first portion, an inner wall second portion, and/or an inner wall third portion that are taken along a plane that is orthogonal to a housing lengthwise axis include cross-sectional configurations that are square, rectangular, circular, oval, triangular, trapezoidal, and any other cross-sectional configuration considered suitable for a particular embodiment. Examples of angles considered suitable for the entirety, or a portion, of an inner wall first portion to be disposed relative to the entirety, or a portion, of an inner wall second portion and/or the entirety, or a portion, of an inner wall second portion to be disposed relative to the entirety, or a portion, of an inner wall third portion include angles greater than 90 degrees, angles between 90 degrees and 180 degrees, angles less than 180 degrees, angles greater than 180 degrees, and any other angle considered suitable for a particular embodiment. Moreover, an inner wall first portion, an inner wall second portion, and/or an inner wall third portion can be tapered along a portion, or the entirety, of its length. Furthermore, an inner wall first portion and/or an inner wall third portion can have a constant inside diameter (e.g., height and/or width) along a portion, or the entirety, of its length. Additionally, an inner wall second portion and an inner wall third portion can meet at a second location that is disposed at any suitable distance from a projection end. Examples of distances considered suitable for a second location to be disposed relative to a projection end include distances that are greater than, equal to, or less than 1 millimeter, 2 millimeters, 3 millimeters, 4 millimeters, 5 millimeters, distances between 3 millimeters and 7 millimeters, and any other distance considered suitable for a particular embodiment.

Figure 12:
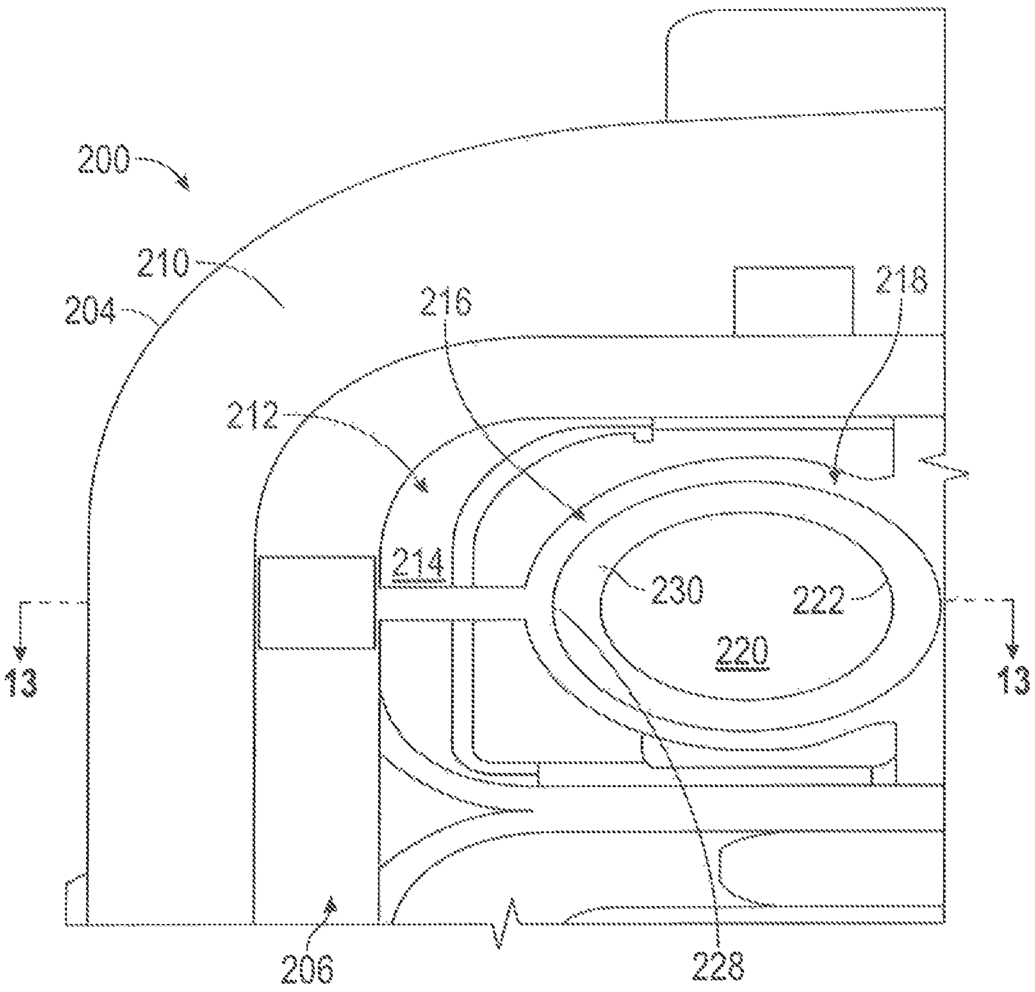
FIG. 12 is a partial elevation view of a second embodiment of an electrical connector that includes tapered terminal passageways.
Figure 13:
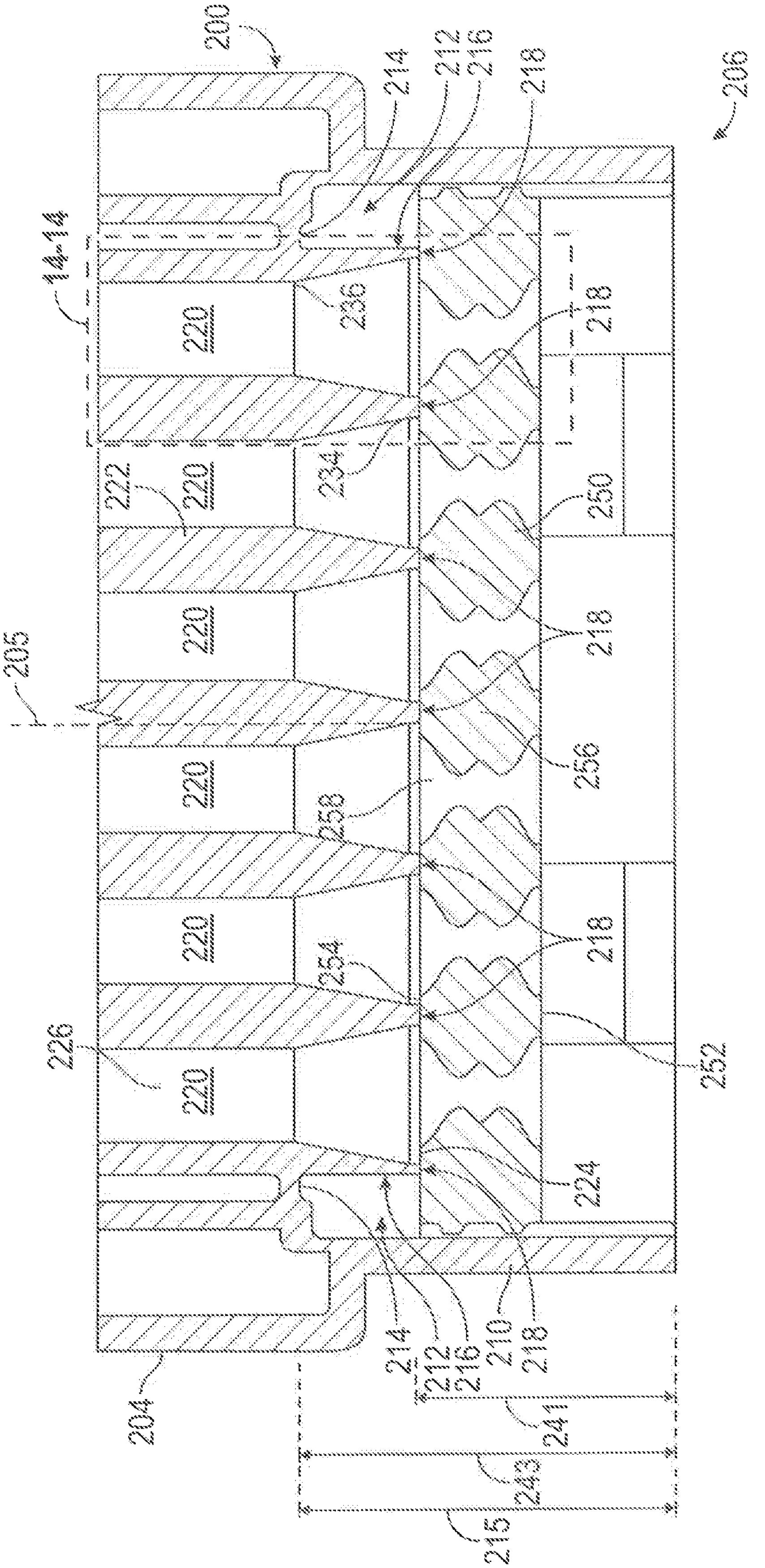
FIG. 13 is a cross-sectional view of the electrical connector illustrated in FIG. 12 taken along line 13-13. A sealing member is disposed adjacent to and contacting the housing.
Figure 14:
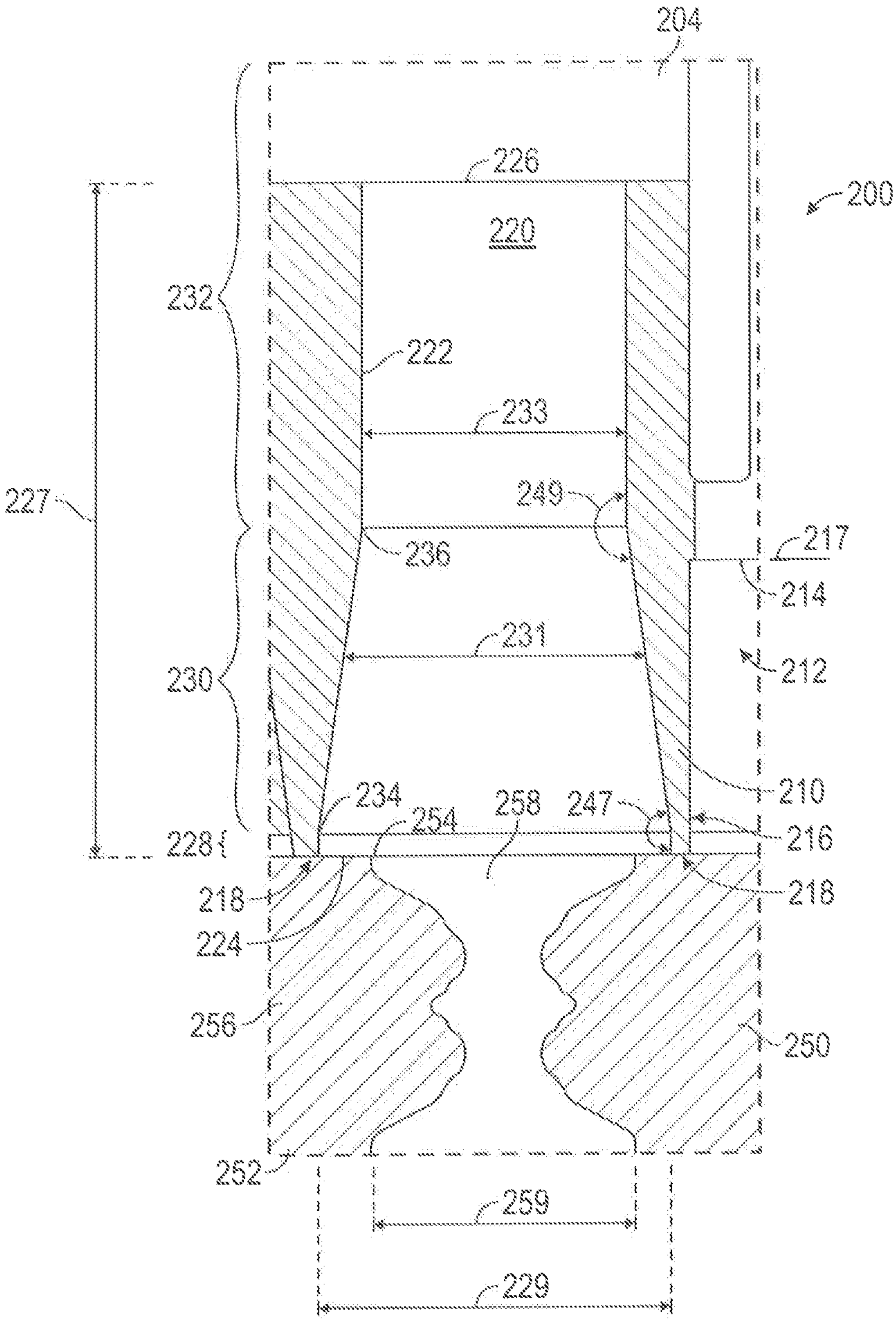
FIG. 14 is a magnified view of area 14-14 shown in FIG. 13.

FIGS. 12, 13, and 14 illustrate a second embodiment of an electrical connector 200 that includes a plurality of terminal passageways 220. In the illustrated embodiment, the electrical connector 200 has a housing 204. The housing 204 has a housing main body 210 that defines a recess 212, a recess base 214, a projection 216, a projection end 218, and plurality of terminal passageways 220. The recess base 214 is disposed a first distance 215 from the housing first end 206.

In the illustrated embodiment, each terminal passageway of the plurality of terminal passageways 220 extends from the projection end 218 and away from the housing first end 206. As shown in FIG. 12, each terminal passageway of the plurality of terminal passageways 220 has an inner wall 222 defined by the housing main body 210 that has a circular cross-sectional configuration taken along a hypothetical plane disposed orthogonally to the housing lengthwise axis 205. As shown in FIG. 14, the inner wall 222 has an inner wall first end 224, an inner wall second end 226, and an inner wall length 227 that extends from the inner wall first end 224 to the inner wall second end 226. The inner wall first end 224 is disposed at the projection end 218. The inner wall 222 tapers along a portion of the inner wall length 227 that extends from the inner wall first end 224 toward the inner wall second end 226.

In the embodiment illustrated, as shown in FIG. 14, the inner wall 222 has an inner wall first portion 228, an inner wall second portion 230, and an inner wall third portion 232. The inner wall first portion 228 has a first inside diameter 229, the inner wall second portion 230 has a second inside diameter 231, and the inner wall third portion 232 has a third inside diameter 233. The first inside diameter 229 is disposed between the inner wall first end 224 and the inner wall second portion 230 and is greater than the second inside diameter 231. The second inside diameter 231 is disposed between the inner wall first portion 228 and the inner wall third portion 232 and is greater than the third inside diameter 233.

The inner wall first portion 228 and the inner wall second portion 230 meet at a first location 234 along the inner wall length 227 that is disposed a second distance 241 from the housing first end 206. The inner wall second portion 230 and the inner wall third portion 232 meet at a second location 236 disposed a third distance 243 from the housing first end 206. The first distance 215 is greater than the second distance 241 and the third distance 243 is equal to the second distance 241. The third distance 243 is closer to the first distance 215 than the second distance 241. Thus, the second location 236 is disposed closer to the hypothetical plane 217 on which the recess base 214 is disposed than the inner wall first end 224.

As shown in FIGS. 12, 13, and 14, the inner wall 222 has a constant inside diameter along the inner wall first portion 228, tapers along the inner wall second portion 230, and the inner wall third portion 232 has a constant inside diameter. In the illustrated embodiment, the inner wall 222 has an inner wall first portion 228 that has a constant inside diameter along the entire first portion length 235, the inner wall 222 tapers along its entire perimeter along the entire second portion length 237, and the inner wall 222 has an inner wall third portion 232 that has a constant inside diameter along the entire third portion length 239. However, alternative embodiments can include an inner wall that includes an inner wall first portion that has an inside diameter that varies along its length. In the illustrated embodiment, the inner wall first portion 228 is disposed at a first angle 247 relative to the inner wall second portion 230 that is less than 180 degrees and the inner wall second portion 230 is disposed at a second angle 249 relative to the inner wall third portion 232 that is greater than 180 degrees.

As shown in FIGS. 13 and 14, a sealing member 250 is disposed adjacent to, and contacts, the housing 204. The sealing member 250 has a sealing member first end 252, a sealing member second end 254, and a sealing member main body 256. The sealing member main body 256 defines a plurality of sealing member passageways 258 aligned with the plurality of terminal passageways 220. Each sealing member passageway of the plurality of sealing member passageways 258 has a fourth inside diameter 259 at the sealing member second end 254 that is less than the first inside diameter 229 of the inner wall first portion 228 and less than the second inside diameter 231.

Figure 15:
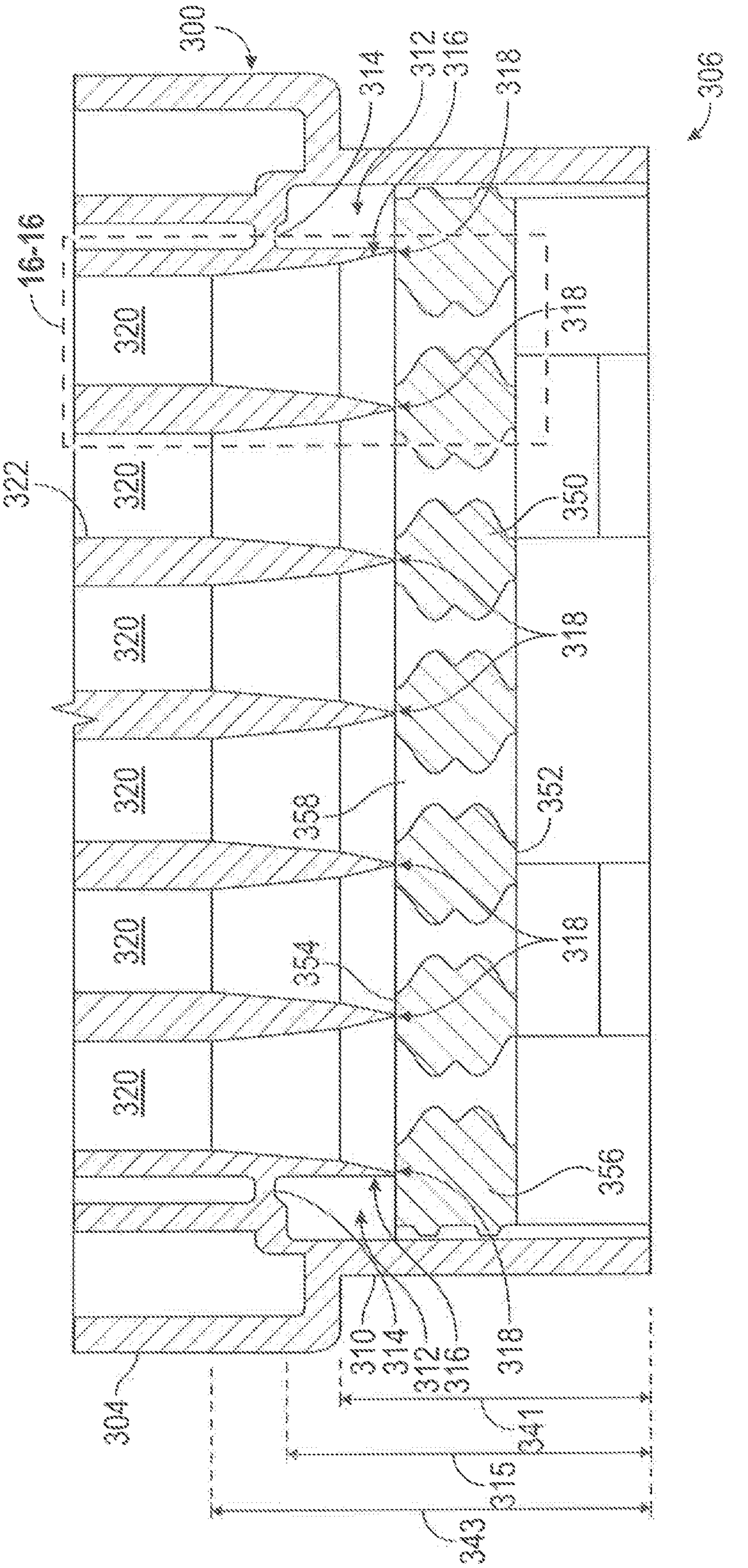
FIG. 15 is a cross-sectional view of a third embodiment of an electrical connector that includes tapered terminal passageways. A sealing member is disposed adjacent to and contacting the housing.
Figure 16:
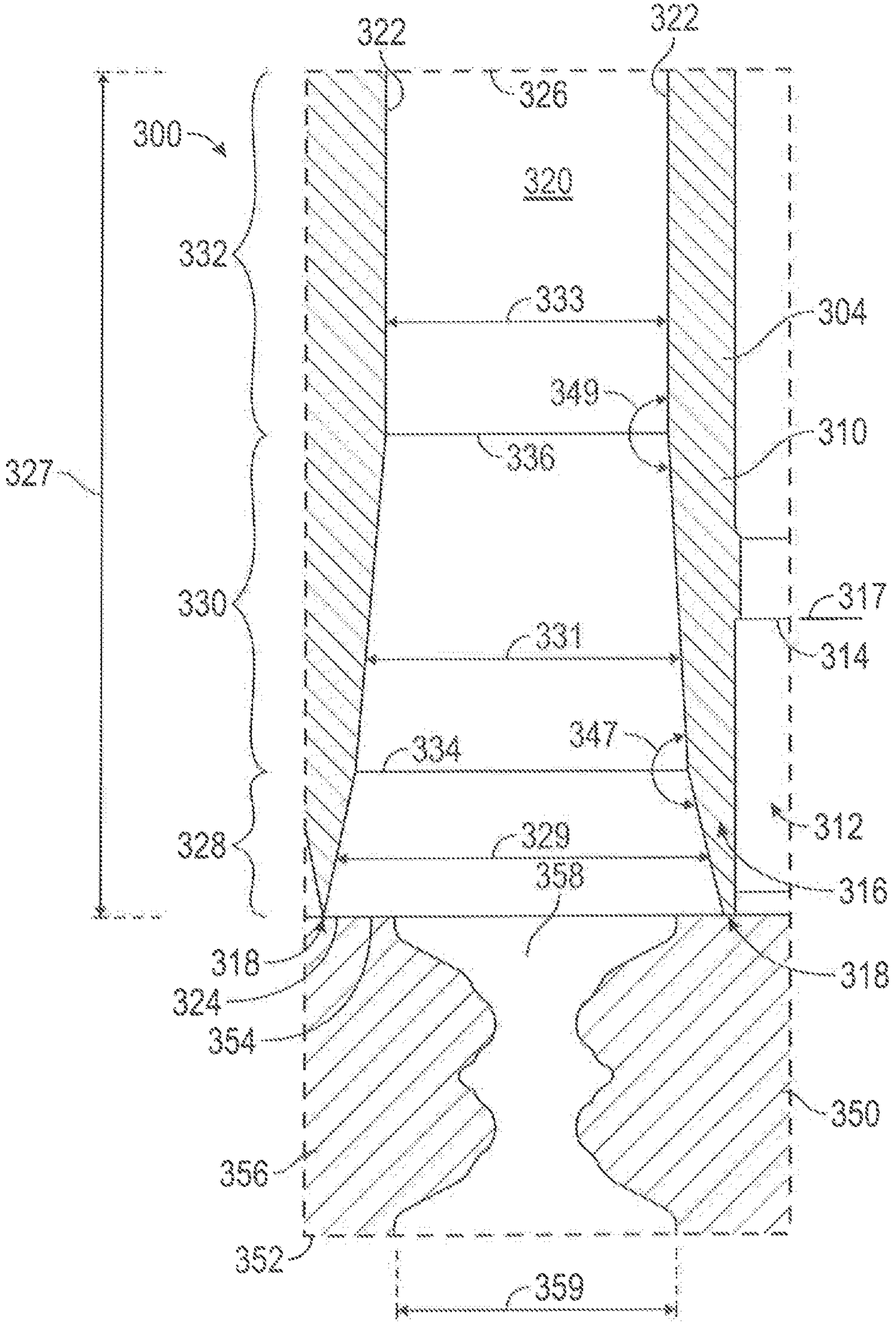
FIG. 16 is a magnified view of area 16-16 shown in FIG. 15.

FIGS. 15 and 16 illustrate a third embodiment of an electrical connector 300 that includes a plurality of terminal passageways 320. In the illustrated embodiment, the electrical connector 300 has a housing 304. The housing 304 has a housing main body 310 that defines a recess 312, a recess base 314, a projection 316, a projection end 318, and plurality of terminal passageways 320. The recess base 314 is disposed a first distance 315 from the housing first end 306.

In the illustrated embodiment, each terminal passageway of the plurality of terminal passageways 320 extends from the projection end 318 and away from the housing first end 306. As shown in FIG. 16, the inner wall 322 has an inner wall first end 324, an inner wall second end 326, and an inner wall length 327 that extends from the inner wall first end 324 to the inner wall second end 326. The inner wall first end 324 is disposed at the projection end 318. The inner wall 322 tapers along a portion of the inner wall length 327 that extends from the inner wall first end 324 toward the inner wall second end 326.

In the embodiment illustrated, the inner wall 322 has an inner wall first portion 328, an inner wall second portion 330, and an inner wall third portion 332. The inner wall first portion 328 has a first inside diameter 329, the inner wall second portion 330 has a second inside diameter 331, and the inner wall third portion 332 has a third inside diameter 333. The first inside diameter 329 is disposed between the inner wall first end 324 and the inner wall second portion 330 and is greater than the second inside diameter 331. The second inside diameter 331 is disposed between the inner wall first portion 328 and the inner wall third portion 332 and is greater than the third inside diameter 333.

The inner wall first portion 328 and the inner wall second portion 330 meet at a first location 334 along the inner wall length 327 that is disposed a second distance 341 from the housing first end 306. The inner wall second portion 330 and the inner wall third portion 332 meet at a second location 336 disposed a third distance 343 from the housing first end 306. The first distance 315 is greater than the second distance 341 and the third distance 343 is greater than the second distance 341. The third distance 343 is greater than the first distance 315 but closer to the first distance 315 than the second distance 341. Thus, the second location 336 is disposed closer to the hypothetical plane 317 on which the recess base 314 is disposed than the inner wall first end 324.

As shown in FIGS. 15 and 16, the inner wall 322 tapers along the inner wall first portion 328, tapers along the inner wall second portion 330, and the inner wall third portion 332 has a constant inside diameter. In the illustrated embodiment, the inner wall 322 tapers along its entire perimeter along the entire first portion length 335, tapers along its entire perimeter along the entire second portion length 337, and the inner wall 322 has a third portion 332 that has a constant inside diameter along the third portion length 339. In the illustrated embodiment, the inner wall first portion 328 is disposed at a first angle 347 relative to the inner wall second portion 330 that is greater than to 180 degrees and the inner wall second portion 330 is disposed at a second angle 349 relative to the inner wall third portion 332 that is greater than 180 degrees.

As shown in FIGS. 15 and 16, a sealing member 350 is disposed adjacent to, and contacts, the housing 304. The sealing member 350 has a sealing member first end 352, a sealing member second end 354, and a sealing member main body 356. The sealing member main body 356 defines a plurality of sealing member passageways 358 aligned with the plurality of terminal passageways 320. Each sealing member passageway of the plurality of sealing member passageways 358 has a fourth inside diameter 359 at the sealing member second end 354 that is less than the first inside diameter 329 of the inner wall first portion 328 and less than the second inside diameter 331.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. An electrical connector, comprising:

a housing having a housing first end, a housing second end, and a housing main body defining a recess, a recess base, a projection, a projection end, and a plurality of terminal passageways, the recess extending from the housing first end toward the housing second end and to the recess base, the projection extending from the recess base toward the housing first end and to the projection end; and each terminal passageway of the plurality of terminal passageways having an inner wall, the inner wall having an inner wall first end disposed at the projection end, an inner wall second end disposed between the projection end and the housing second end, and an inner wall length extending from the inner wall first end to the inner wall second end, the inner wall tapering along a portion of the inner wall length extending from the inner wall first end toward the inner wall second end, wherein the tapered inner wall receives a portion of a sealing member that is disposed adjacent to the housing.

2. The electrical connector of claim 1, further comprising the sealing member contacting the housing, wherein the sealing member comprises a sealing member main body and configured to move between a first configuration and a second configuration, wherein the sealing member main body defining a plurality of sealing member passageways aligned with the plurality of terminal passageways, wherein in the first configuration, a portion of the sealing member main body is disposed outside of a first passageway of the plurality of terminal passageways, and wherein in the second configuration, the portion of the sealing member main body is disposed within the first passageway of the plurality of terminal passageways.

3. The electrical connector of claim 1, wherein the housing has a housing lengthwise axis, and wherein each terminal passageway of the plurality of terminal passageways has a rectangular cross-sectional configuration taken along plane disposed orthogonal to the housing lengthwise axis.

4. The electrical connector of claim 1, wherein the housing main body is formed of a first material and the sealing member is formed of a second material, and wherein the second material is more flexible than the first material.

5. The electrical connector of claim 1, wherein the inner wall comprises an inner wall first portion, an inner wall second portion, and an inner wall third portion, the inner wall first portion having a first inside diameter, the inner wall second portion having a second inside diameter, the inner wall third portion having a third inside diameter, the inner wall first portion extending from the inner wall first end toward the inner wall second end and to the inner wall second portion, the inner wall second portion extending from the inner wall first portion toward the inner wall second end and to the inner wall third portion, the inner wall third portion extending from the inner wall second portion to the inner wall second end, the first inside diameter is greater than the second inside diameter, the second inside diameter is greater than the third inside diameter.

6. The electrical connector of claim 5, wherein the first inside diameter varies along an entire first portion length of the inner wall first portion.

7. The electrical connector of claim 5, wherein the inner wall tapers along an entire first portion length of the inner wall first portion.

8. The electrical connector of claim 5, wherein the inner wall has a constant inside diameter along an entire first portion length of the inner wall first portion.

9. The electrical connector of claim 5, wherein the inner wall first portion is disposed at a first angle relative to the inner wall second portion that is greater than 180 degrees.

10. The electrical connector of claim 5, wherein the first inside diameter is disposed at the inner wall first end.

11. The electrical connector of claim 5, wherein the inner wall second portion has a second portion length extending from the inner wall first portion to the inner wall third portion, and wherein the inner wall tapers along the entire perimeter of the inner wall along the entire second portion length.

12. The electrical connector of claim 5, wherein the recess base is disposed at a first distance from the housing first end, wherein the inner wall first portion and the inner wall second portion meet at a first location along the inner wall length, the inner wall second portion and the inner wall third portion meet at a second location along the inner wall length, the first location disposed at a second distance from the housing first end, the second location disposed at a third distance from the housing first end, wherein the first distance is greater than the second distance, and wherein the third distance is greater than the second distance.

13. The electrical connector of claim 12, wherein the inner wall second end is disposed between the second location and the housing second end.

14. The electrical connector of claim 12, wherein the second location is disposed at a fourth distance from the projection end that is greater than 1 millimeter.

15. The electrical connector of claim 14, wherein the fourth distance is equal to about 5 millimeters.

16. The electrical connector of claim 5, wherein the inner wall second portion is disposed at a second angle relative to the inner wall third portion that is greater than 180 degrees.

17. The electrical connector of claim 16, wherein the second angle is one of equal to or about 188 degrees.

18. An electrical connector, comprising:

a housing having a housing first end, a housing second end, and a housing main body defining a recess, a recess base, a projection, a projection end, and a plurality of terminal passageways, the recess extending from the housing first end toward the housing second end and to the recess base, the recess base disposed a first distance from the housing first end, the projection extending from the recess base toward the housing first end and to the projection end; and each terminal passageway of the plurality of terminal passageways having an inner wall, the inner wall having an inner wall first end disposed at the projection end, an inner wall second end disposed between the projection end and the housing second end, an inner wall length extending from the inner wall first end to the inner wall second end, the inner wall comprises an inner wall first portion, an inner wall second portion, and an inner wall third portion, the inner wall first portion having a first inside diameter, the inner wall second portion having a second inside diameter, the inner wall third portion having a third inside diameter, the inner wall first portion extending from the inner wall first end toward the inner wall second end and to the inner wall second portion, the inner wall second portion extending from the inner wall first portion toward the inner wall second end and to the inner wall third portion, the inner wall third portion extending from the inner wall second portion to the inner wall second end, the first inside diameter is greater than the second inside diameter, the second inside diameter is greater than the third inside diameter, the inner wall tapering along a portion of the inner wall length extending from the inner wall first end toward the inner wall second end, wherein the tapered inner wall receives a portion of a sealing member that is disposed adjacent to the housing, the inner wall first portion and the inner wall second portion meeting at a first location along the inner wall length, the inner wall second portion and the inner wall third portion meeting at a second location along the inner wall length, the first location disposed at a second distance from the housing first end, the second location disposed at a third distance from the housing first end, the first distance is greater than the second distance, the third distance is greater than the second distance.

19. An electrical connector, comprising:

a housing having a housing first end, a housing second end, and a housing main body defining a recess, a recess base, a projection, a projection end, and a plurality of terminal passageways, the recess extending from the housing first end toward the housing second end and to the recess base, the recess base disposed a first distance from the housing first end, the projection extending from the recess base toward the housing first end and to the projection end; and each terminal passageway of the plurality of terminal passageways having an inner wall, the inner wall having an inner wall first end disposed at the projection end, an inner wall second end disposed between the projection end and the housing second end, an inner wall length extending from the inner wall first end to the inner wall second end, the inner wall comprises an inner wall first portion, an inner wall second portion, and an inner wall third portion, the inner wall first portion having a first inside diameter, the inner wall second portion having a second inside diameter, the inner wall third portion having a third inside diameter, the inner wall first portion extending from the inner wall first end toward the inner wall second end and to the inner wall second portion, the inner wall second portion extending from the inner wall first portion toward the inner wall second end and to the inner wall third portion, the inner wall third portion extending from the inner wall second portion to the inner wall second end, the first inside diameter is greater than the second inside diameter, the second inside diameter is greater than the third inside diameter, the inner wall tapering along the inner wall first portion and the inner wall second portion, wherein the tapered inner wall receives a portion of a sealing member that is disposed adjacent to the housing, the inner wall first portion and the inner wall second portion meeting at a first location along the inner wall length, the inner wall second portion and the inner wall third portion meeting at a second location along the inner wall length, the first location disposed at a second distance from the housing first end, the second location disposed at a third distance from the housing first end and at a fourth distance from the projection end, and wherein the fourth distance is greater than 1 millimeter, the first distance is greater than the second distance, the third distance is greater than the second distance.

* * * * *